United States Patent
Wu et al.

(10) Patent No.: US 10,447,369 B2
(45) Date of Patent: Oct. 15, 2019

(54) METHOD AND APPARATUS FOR OBTAINING CHANNEL STATE INFORMATION

(71) Applicant: Huawei Technologies Co., Ltd., Shenzhen, Guangdong (CN)

(72) Inventors: Ye Wu, Shanghai (CN); Jin Liu, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/858,969

(22) Filed: Dec. 29, 2017

(65) Prior Publication Data

US 2018/0123671 A1    May 3, 2018

Related U.S. Application Data

(63) Continuation of application No. PCT/CN2015/082954, filed on Jun. 30, 2015.

(51) Int. Cl.
*H04W 72/04* (2009.01)
*H04B 7/06* (2006.01)
(Continued)

(52) U.S. Cl.
CPC ......... *H04B 7/0626* (2013.01); *H04B 7/0639* (2013.01); *H04L 25/0202* (2013.01); *H04W 24/10* (2013.01); *H04W 72/0413* (2013.01)

(58) Field of Classification Search
None
See application file for complete search history.

(56) References Cited

U.S. PATENT DOCUMENTS

| 7,426,198 B2* | 9/2008 | Mondal | H04B 7/0617 |
| | | | 370/329 |
| 9,407,343 B2* | 8/2016 | Krishnamurthy | H04J 11/0053 |
| | | | 370/328 |

(Continued)

FOREIGN PATENT DOCUMENTS

| CN | 102468916 A | 5/2012 |
| CN | 102938688 A | 2/2013 |

(Continued)

OTHER PUBLICATIONS

Qualcomm Inc.; "Signaling requirements for transparent MU-MIMO operation"; 3GPP TSG RAN WG1 #62; R1-104803; Madrid, Spain; Aug. 23-27, 2010; 8 pages.

*Primary Examiner* — Anh Vu H Ly
(74) *Attorney, Agent, or Firm* — Leydig, Voit & Mayer, Ltd.

(57) ABSTRACT

Embodiments of the present disclosure provide a method for obtaining channel state information, including: sending, by a base station, one or multiple pieces of downlink signaling to user equipment, where the one or multiple pieces of downlink signaling instruct the user equipment to feed back channel dimension information, where the channel dimension information includes an effective dimension of a channel subspace of a statistical channel between the base station and the user equipment, and the effective dimension of the channel subspace is less than a quantity of reference signal ports used to measure channel state information; and receiving, by the base station, the channel dimension information fed back by the user equipment.

16 Claims, 12 Drawing Sheets

(51) Int. Cl.
*H04L 25/02* (2006.01)
*H04W 24/10* (2009.01)

(56) References Cited

U.S. PATENT DOCUMENTS

| | | | |
|---|---|---|---|
| 2010/0232525 A1* | 9/2010 | Xia | H04B 7/0626 |
| | | | 375/259 |
| 2013/0215988 A1 | 8/2013 | Nagata et al. | |
| 2014/0010318 A1* | 1/2014 | Kim | H04B 7/0639 |
| | | | 375/267 |
| 2014/0192744 A1 | 7/2014 | Zhou et al. | |
| 2014/0192762 A1 | 7/2014 | Li et al. | |
| 2014/0226746 A1 | 8/2014 | Ko et al. | |
| 2016/0156401 A1* | 6/2016 | Onggosanusi | H04B 7/0478 |
| | | | 370/329 |
| 2017/0085303 A1* | 3/2017 | Chen | H04B 7/0417 |
| | | | 370/328 |

FOREIGN PATENT DOCUMENTS

| | | |
|---|---|---|
| CN | 103001678 A | 3/2013 |
| CN | 104539335 A | 4/2015 |
| CN | 104580033 A | 4/2015 |
| WO | 2013191503 A1 | 12/2013 |

\* cited by examiner

METHOD AND APPARATUS FOR OBTAINING CHANNEL STATE INFORMATION

METHOD AND APPARATUS FOR OBTAINING CHANNEL STATE INFORMATION CROSS-REFERENCE TO RELATED APPLICATIONS

This application is a continuation of International Application No. PCT/CN2015/082954, filed on Jun. 30, 2015, which is hereby incorporated by reference in its entirety.

TECHNICAL FIELD

The present application relates to the field of communications technologies, and specifically, to a method and an apparatus for obtaining channel state information.

BACKGROUND

In 3GPP Long Term Evolution (LTE) and 3GPP Long Term Evolution-Advanced (LTE-A), with a continuous and rapid increase in a quantity of antennas at a data transmit end, a quantity of user equipments (UE) that need to be served, that is, a quantity of to-be-scheduled UEs, also rapidly increases. The increase in the quantity of antennas can provide higher spatial degrees of freedom. This creates a favorable condition for multiplexing multiple data streams in downlink space, for example, for multiple-input multiple-output (MIMO), including single user multiple-input multiple-output and multi-user multiple-input multiple-output.

To obtain high spatial degrees of freedom that can be provided by massive antennas, the data transmit end (for example, a base station) needs to obtain related channel state information (CSI), so as to obtain a precise precoding matrix. In MIMO, the data transmit end generally obtains the CSI by using two methods in the prior art (for example, LTE/LTE-A):

In one method, in a case of time division duplex (TDD) or frequency division duplex (FDD), the data transmit end sends a pilot for downlink CSI measurement, a data receive end (for example, UE) measures the pilot to obtain CSI, the UE then feeds back the CSI, and the data transmit end performs precoding on data by using the CSI and sends precoded data. The CSI that is fed back by the UE is generally quantized CSI, and is a precoding matrix indicator (PMI) and a rank indicator (RI) in LTE. In the other method, in a case of TDD, a data receive end sends a pilot for uplink CSI measurement, for example, a sounding reference signal (SRS) in LTE/LTE-A, the data transmit end performs uplink channel CSI measurement, and the data transmit end considers, according to channel reciprocity, that uplink channel measurement is equivalent to downlink channel measurement (a necessary reciprocity parameter is generally required for calibration), and then performs precoding on data according to the CSI and sends precoded data.

Currently, a key to obtaining CSI in MIMO is to rapidly obtain complete real-time CSI (completeness refers to channel information of all antennas at a data transmit end) at a time, so as to obtain a most accurate channel as much as possible. Only a level-1 reference signal (RS) needs to be used to obtain the CSI. Specifically, the level-1 RS may have the following two implementations:

Implementation 1: As shown in FIG. 1, a data transmit end first sends a pilot for downlink CSI measurement, for example, a CSI-RS or a cell-specific reference signal (CRS) in LTE/LTE-A, a data receive end measures the pilot to obtain CSI (for example, a precoding matrix in LTE/LTE-A) and performs quantization on the CSI, the data receive end feeds back quantized CSI to the transmit end, and the transmit end performs precoding on data by using the CSI and sends precoded data. This solution is applicable to FDD and TDD.

Implementation 2: As shown in FIG. 2, a data receive end transmits a pilot for uplink CSI measurement, for example, an SRS in LTE/LTE-A, and a data transmit end measures the pilot to obtain CSI, for example, a precoding matrix in LTE/LTE-A, and then performs precoding on data according to the CSI and sends precoded data. This solution is applicable to TDD.

An amount of downlink pilot overheads is directly proportional to a quantity of antennas at a data transmit end, an amount of uplink pilot overheads are directly proportional to a quantity of to-be-served UEs, and a quantity of uplink CSI feedbacks is also directly proportional to the quantity of antennas at the data transmit end. Therefore, when the quantity of antennas at the data transmit end is not quite large (for example, 4/8 antennas in LTE/LTE-A), pilot overheads and the quantity of uplink CSI feedbacks can be controlled. However, when the quantity of antennas at the data transmit end is relatively large (a quantity of UEs that can be scheduled also increases), uplink and downlink pilot overheads and the quantity of uplink CSI feedbacks occupy a large quantity of time-frequency resources. As a result, time-frequency resources available for data transmission are reduced, and a system throughput is greatly affected.

In the prior art, an array whose dimension is a quantity of antennas at a data transmit end needs to be processed. This poses an unprecedented challenge to a baseband processing capability of the data transmit end. Both a CSI feedback using downlink measurement and uplink CSI measurement easily cause excessive pilot overheads for obtaining CSI and excessive computation for obtaining channel information when there is a relatively large quantity of antennas at a transmit end.

SUMMARY

Embodiments of the present disclosure provide a method and an apparatus for obtaining channel state information, so as to reduce pilot overheads and computational complexity for obtaining channel state information.

According to a first aspect, an embodiment of the present disclosure provides a method for obtaining channel state information, including:

sending, by a base station, one or multiple pieces of downlink signaling to user equipment, where the one or multiple pieces of downlink signaling instruct the user equipment to feed back channel dimension information, where the channel dimension information includes an effective dimension of a channel subspace of a statistical channel between the base station and the user equipment, and the effective dimension of the channel subspace is less than a quantity of reference signal ports used to measure channel state information; and receiving, by the base station, the channel dimension information fed back by the user equipment.

With reference to the first aspect, in a first possible implementation of the first aspect, the channel dimension information further includes a subspace index in the effective dimension of the channel subspace; and the subspace index is in a one-to-one correspondence with a quantized precoding matrix of eigenvectors of the channel subspace.

With reference to the first possible implementation of the first aspect, in a second possible implementation of the first aspect, the quantized precoding matrix, corresponding to the subspace index, of the eigenvectors of the channel subspace includes partial energy of the statistical channel.

With reference to the first aspect or the first or the second possible implementation of the first aspect, in a third possible implementation of the first aspect, the sending, by a base station, multiple pieces of downlink signaling to user equipment includes sending, by the base station, first downlink signaling to the user equipment, where the first downlink signaling instructs the user equipment to feed back the effective dimension of the channel subspace;

the receiving, by the base station, the channel dimension information fed back by the user equipment includes receiving, by the base station, the effective dimension of the channel subspace that is fed back by the user equipment;

the sending, by a base station, multiple pieces of downlink signaling to user equipment further includes sending, by the base station, second downlink signaling to the user equipment, where the second downlink signaling instructs the user equipment to feed back the subspace index, and the second downlink signaling carries an effective dimension of the channel subspace that is determined by the base station according to the effective dimension of the channel subspace that is fed back by the user equipment; and the receiving, by the base station, the channel dimension information fed back by the user equipment includes receiving, by the base station, a subspace index that is fed back by the user equipment and that is in the effective dimension of the channel subspace that is determined by the base station.

With reference to the third possible implementation of the first aspect, in a fourth possible implementation of the first aspect, the user equipment is to-be-scheduled user equipment.

With reference to the first aspect or the first or the second possible implementation of the first aspect, in a fifth possible implementation of the first aspect, the sending, by a base station, one piece of downlink signaling to user equipment includes sending, by the base station, third downlink signaling to the user equipment, where the third downlink signaling instructs the user equipment to feedback the effective dimension of the channel subspace and the subspace index in the effective dimension of the channel subspace; and the receiving, by the base station, the channel dimension information fed back by the user equipment includes receiving, by the base station, the effective dimension of the channel subspace and the subspace index in the effective dimension of the channel subspace that are fed back by the user equipment.

With reference to the fifth possible implementation of the first aspect, in a sixth possible implementation of the first aspect, the method further includes:

determining, by the base station, an effective dimension of the channel subspace according to the effective dimension of the channel subspace and the subspace index that are fed back by the user equipment;

sending, by the base station, fourth downlink signaling to the user equipment, where the fourth downlink signaling instructs the user equipment to feed back a subspace index in the effective dimension of the channel subspace that is determined by the base station; and receiving, by the base station, the subspace index that is fed back by the user equipment and that is in the effective dimension of the channel subspace that is determined by the base station.

With reference to any one of the first aspect or the first to the sixth possible implementations of the first aspect, in a seventh possible implementation of the first aspect, that the one or multiple pieces of downlink signaling instruct the user equipment to feed back channel dimension information includes: the one or multiple pieces of downlink signaling instruct the user equipment to periodically feed back the channel dimension information; and the receiving, by the base station, the channel dimension information fed back by the user equipment includes receiving, by the base station, the channel dimension information that is periodically fed back by the user equipment, where a feedback period is indicated by the one or multiple pieces of downlink signaling or is pre-agreed.

With reference to any one of the first aspect or the first to the sixth possible implementations of the first aspect, in an eighth possible implementation of the first aspect, that the one or multiple pieces of downlink signaling instruct the user equipment to feed back channel dimension information includes: the one or multiple pieces of downlink signaling instruct the user equipment to feed back the channel dimension information at a time; and the receiving, by the base station, the channel dimension information fed back by the user equipment includes receiving, by the base station, the channel dimension information that is fed back by the user equipment at a time.

According to a second aspect, an embodiment of the present disclosure provides a method for feeding back channel state information, including:

receiving, by user equipment, one or multiple pieces of downlink signaling from a base station, where the one or multiple pieces of downlink signaling instruct the user equipment to feedback channel dimension information, where the channel dimension information includes an effective dimension of a channel subspace of a statistical channel between the base station and the user equipment, and the effective dimension of the channel subspace is less than a quantity of reference signal ports used to measure channel state information; and feeding back, by the user equipment, the channel dimension information to the base station.

With reference to the second aspect, in a first possible implementation of the second aspect, the channel dimension information further includes a subspace index in the effective dimension of the channel subspace; and the subspace index is in a one-to-one correspondence with a quantized precoding matrix of eigenvectors of the channel subspace.

With reference to the first possible implementation of the second aspect, in a second possible implementation of the second aspect, the quantized precoding matrix, corresponding to the subspace index, of the eigenvectors of the channel subspace includes partial energy of the statistical channel.

With reference to the second aspect or the first or the second possible implementation of the second aspect, in a third possible implementation of the second aspect, the method further includes: performing, by the user equipment, statistical measurement on the channel subspace to obtain the effective dimension of the channel subspace.

According to a third aspect, an embodiment of the present disclosure provides an apparatus for obtaining channel state information, including:

a sending module, configured to send, by a base station, one or multiple pieces of downlink signaling to user equipment, where the one or multiple pieces of downlink signaling instruct the user equipment to feed back channel dimension information, where the channel dimension information includes an effective dimension of a channel subspace of a statistical channel between the base station and the user equipment, and the effective dimension of the channel subspace is less than a quantity of reference signal ports used to measure channel state information; and a receiving module, configured to receive, by the base station, the channel dimension information fed back by the user equipment.

With reference to the third aspect, in a first possible implementation of the third aspect, the channel dimension information further includes a subspace index in the effective dimension of the channel subspace; and the subspace index is in a one-to-one correspondence with a quantized precoding matrix of eigenvectors of the channel subspace.

With reference to the first possible implementation of the third aspect, in a second possible implementation of the third aspect, the quantized precoding matrix, corresponding to the subspace index, of the eigenvectors of the channel subspace includes partial energy of the statistical channel.

With reference to the third aspect or the first or the second possible implementation of the third aspect, in a third possible implementation of the third aspect, the sending, by a base station, multiple pieces of downlink signaling to user equipment includes sending, by the base station, first downlink signaling to the user equipment, where the first downlink signaling instructs the user equipment to feed back the effective dimension of the channel subspace;

the receiving, by the base station, the channel dimension information fed back by the user equipment includes receiving, by the base station, the effective dimension of the channel subspace that is fed back by the user equipment;

the sending, by the base station, multiple pieces of downlink signaling to user equipment further includes sending, by the base station, second downlink signaling to the user equipment, where the second downlink signaling instructs the user equipment to feed back the subspace index, and the second downlink signaling carries an effective dimension of the channel subspace that is determined by the base station according to the effective dimension of the channel subspace that is fed back by the user equipment; and the receiving, by the base station, the channel dimension information fed back by the user equipment includes receiving, by the base station, a subspace index that is fed back by the user equipment and that is in the effective dimension of the channel subspace that is determined by the base station.

With reference to the third possible implementation of the third aspect, in a fourth possible implementation of the third aspect, the user equipment is to-be-scheduled user equipment.

With reference to the third aspect or the first or the second possible implementation of the third aspect, in a fifth possible implementation of the third aspect, the sending, by a base station, one piece of downlink signaling to user equipment includes sending, by the base station, third downlink signaling to the user equipment, where the third downlink signaling instructs the user equipment to feedback the effective dimension of the channel subspace and the subspace index in the effective dimension of the channel subspace; and the receiving, by the base station, the channel dimension information fed back by the user equipment includes receiving, by the base station, the effective dimension of the channel subspace and the subspace index in the effective dimension of the channel subspace that are fed back by the user equipment.

With reference to the fifth possible implementation of the third aspect, in a sixth possible implementation of the third aspect, the apparatus further includes:

a determining module, configured to determine, by the base station, an effective dimension of the channel subspace according to the effective dimension of the channel subspace and the subspace index that are fed back by the user equipment, where the sending module is further configured to send, by the base station, fourth downlink signaling to the user equipment, where the fourth downlink signaling instructs the user equipment to feedback a subspace index in the effective dimension of the channel subspace that is determined by the base station; and the receiving module is further configured to receive, by the base station, the subspace index that is fed back by the user equipment and that is in the effective dimension of the channel subspace that is determined by the base station.

With reference to any one of the third aspect or the first to the sixth possible implementations of the third aspect, in a seventh possible implementation of the third aspect, that the one or multiple pieces of downlink signaling instruct the user equipment to feed back channel dimension information includes: the one or multiple pieces of downlink signaling instruct the user equipment to periodically feed back the channel dimension information; and the receiving, by the base station, the channel dimension information fed back by the user equipment includes receiving, by the base station, the channel dimension information that is periodically fed back by the user equipment, where a feedback period is indicated by the one or multiple pieces of downlink signaling or is pre-agreed.

With reference to any one of the third aspect or the first to the sixth possible implementations of the third aspect, in an eighth possible implementation of the third aspect, that the one or multiple pieces of downlink signaling instruct the user equipment to feed back channel dimension information includes: the one or multiple pieces of downlink signaling instruct the user equipment to feed back the channel dimension information at a time; and the receiving, by the base station, the channel dimension information fed back by the user equipment includes receiving, by the base station, the channel dimension information that is fed back by the user equipment at a time.

According to a fourth aspect, an embodiment of the present disclosure provides an apparatus for feeding back channel state information, including:

a receiving module, configured to receive, by user equipment, one or multiple pieces of downlink signaling from a base station, where the one or multiple pieces of downlink signaling instruct the user equipment to feed back channel dimension information, where the channel dimension information includes an effective dimension of a channel subspace of a statistical channel between the base station and the user equipment, and the effective dimension of the channel subspace is less than a quantity of reference signal ports used to measure channel state information; and a feedback module, configured to feed back, by the user equipment, the channel dimension information to the base station.

With reference to the fourth aspect, in a first possible implementation of the fourth aspect, the channel dimension information further includes a subspace index in the effective dimension of the channel subspace; and the subspace index is in a one-to-one correspondence with a quantized precoding matrix of eigenvectors of the channel subspace.

With reference to the first possible implementation of the fourth aspect, in a second possible implementation of the fourth aspect, the quantized precoding matrix, corresponding to the subspace index, of the eigenvectors of the channel subspace includes partial energy of the statistical channel.

With reference to the fourth aspect or the first or the second possible implementation of the fourth aspect, in a third possible implementation of the fourth aspect, the apparatus further includes:

a measurement module, configured to perform, by the user equipment, statistical measurement on the channel subspace to obtain the effective dimension of the channel subspace.

According to the embodiments of the present disclosure, user equipment feeds back effective dimension information (or channel dimension information) of a statistical channel of the user equipment for use by a base station. The channel dimension information may include an effective dimension of a channel subspace and a subspace index, and the effective dimension of the channel subspace is less than a quantity of reference signal ports used to measure channel state information. Because the effective dimension of the channel subspace is less than the quantity of reference signal ports used to measure the channel state information, spatial streams needing to be used to feed back the channel state information are reduced compared with those in the prior art. Therefore, pilot overheads and computational complexity for obtaining channel state information are reduced.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
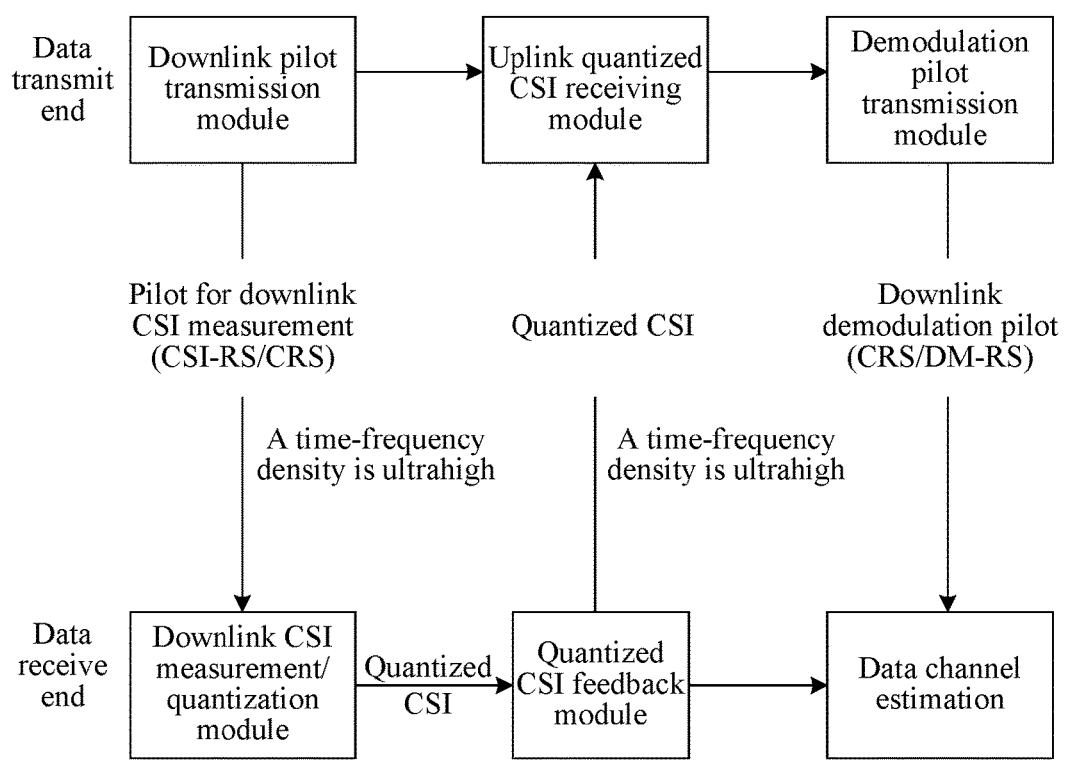
FIG. 1 is an implementation of obtaining CSI in the prior art.
Figure 2:
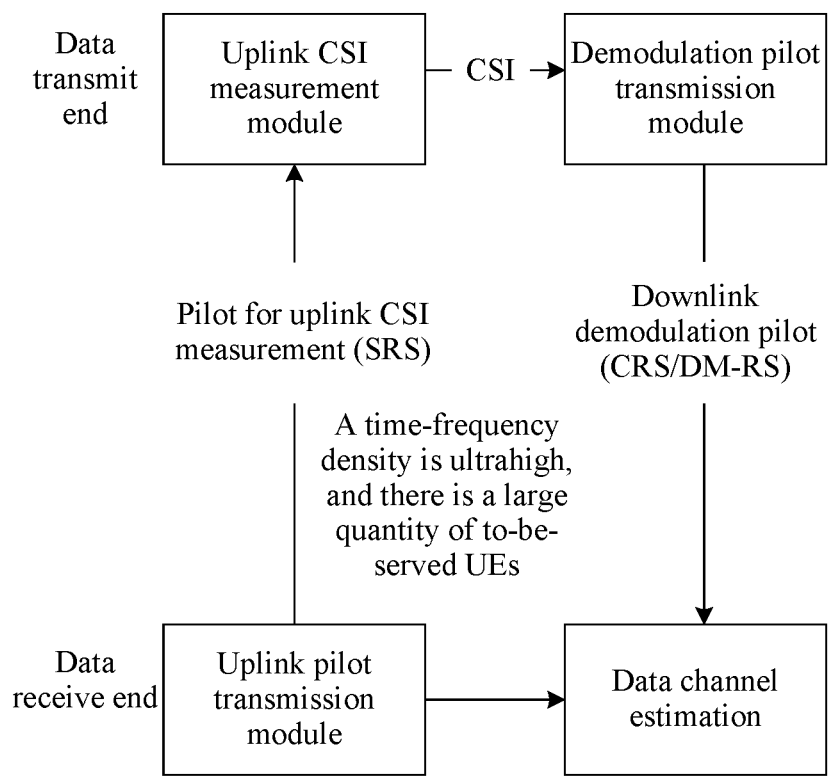
FIG. 2 is another implementation of obtaining CSI in the prior art.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, user equipment (UE), which is also referred to as a mobile terminal, mobile user equipment, or the like, may communicate with one or more core networks by using a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges voice and/or data with the radio access network.

A base station (BS) may be a base transceiver station (BTS) in GSM or CDMA, or may be a NodeB in WCDMA, or may be an evolved NodeB (eNB or e-NodeB) in LTE or a base station in a future evolved public land mobile network (PLMN) communications system ("5G network" for short). This is not limited in the present disclosure.

In wireless communications, channel state information (CSI) refers to channel characteristics of a communications link. The CSI describes impact on a signal when the signal passes through a channel from a transmitter to a receiver, such as scattering, fading, and energy attenuation with distance. The information allows transmission to adapt to a channel environment, so as to achieve a high data rate and reliable communication in a multiple-antenna system.

According to the embodiments of the present disclosure, before channel state information is obtained in a conventional manner, user equipment (UE) feeds back effective dimension information (or channel dimension information) of a statistical channel of the UE for use by a base station. The channel dimension information may include an effective dimension S of a channel subspace and a subspace index (SI), and S is less than or equal to a quantity of reference signal ports used to measure channel state information. The channel dimension information may be understood as specific CSI. Pilot overheads required in obtaining the channel dimension information are roughly directly proportional to S, while pilot overheads for obtaining CSI in the prior art are roughly directly proportional to a product of a quantity of transmit antennas and a rank. The former pilot overheads are far less than the latter pilot overheads. Therefore, pilot overheads for obtaining channel state information can be reduced.

Specifically, in an application scenario in which there are a relatively large quantity of base station antennas, channel dimension information of a statistical channel is obtained, and a dimension that is of a precoding matrix and that is indicated by an SI in S is S. However, a dimension of a precoding matrix in the prior art is a product of a quantity of transmit antennas and a rank. The former dimension is far less than the latter dimension. Because computation for obtaining state information involves a large amount of computation of a precoding matrix, and computational complexity of the matrix decreases as a dimension of the matrix decreases, computational complexity for obtaining channel state information can also be effectively reduced according to the embodiments of the present disclosure.

Channel subspace and effective dimension of the channel subspace:

Generally, a channel subspace is corresponding to a wideband channel and needs to be represented by a subspace index (SI) that is obtained by the UE by performing at least two times of channel measurement. Specifically, the at least two times of channel measurement are statistical measurement performed on a channel. In this case, a channel in the embodiments of the present disclosure may be referred to as a statistical channel, and a channel subspace R is as follows:

$$R = E(H^H H), \text{where}$$

H is a statistical channel, $H^H$ is a Hermitian matrix of H, and E(●) is an operation to find an expectation of a matrix ●; and R may be obtained by means of multiple statistics, including alpha filtering in a time domain or averaging in a frequency domain.

After eigenvalue decomposition (EVD) or singular-value decomposition (SVD) is performed on R, the following result may be obtained:

$$R = E(H^H H) = UAU^H = (u_1 u_2 \ldots u_M) \text{diag}(\lambda_1 \lambda_2 \ldots \lambda_M)(u_1 u_2 \ldots u_M)^H, \text{where}$$

$\lambda_1 \lambda_2 \ldots \lambda_M$ are eigenvalues of the channel subspace, and M is a quantity of reference signal ports used to measure channel state information.

Further, a quantized precoding matrix $\tilde{U} = [u_1 \ u_2 \ldots u_S]$ of eigenvectors of the channel subspace can be obtained according to the decomposition result, where S is equivalent to a quantity of effective eigenvalues of the channel subspace. When the quantity of effective eigenvalues of the channel subspace is S, it indicates that the quantized precoding matrix of the eigenvectors corresponding to S eigenvalues includes partial energy (for example, 90% of energy, which is equivalent to including most channel state information) of the channel or may meet actual requirements. Specifically, transformation (for example, matrix transformation) may be performed, so that the eigenvalues of the channel subspace meet $\lambda_1 \geq \lambda_2 \geq \ldots \lambda_S \gg \lambda_{S+1} \geq \ldots \lambda_M$, that is, the first S eigenvalues can be effective eigenvalues. In this case, S is referred to as an effective dimension of the channel subspace (specifically, S is equivalent to a dimension of the precoding matrix $\tilde{U}$ of the channel subspace). The effective dimension of the channel subspace is less than or equal to the quantity of reference signal ports used to measure the channel state information (generally, in other words, the effective dimension of the channel subspace is less than or equal to a quantity of transmit antenna ports).

Manners of feeding back channel dimension information:

Optionally, a base station may instruct, by using downlink signaling, UE to periodically feed back channel dimension information in a periodic mode. Further, when the base station requests, by using downlink signaling, the UE to stop feeding back the information, the UE stops the feedback.

Optionally, a base station may proactively send signaling in a trigger mode, to request the UE to feedback channel dimension information. The mode may be aperiodic and triggered according to actual needs. In this case, the feedback of the channel dimension information is performed at a time or triggered by using signaling.

Compared with the trigger mode, the periodic mode needs to additionally indicate a feedback period to the UE. The period may be pre-agreed, or may be carried in indication information. In the latter case, a length of the period can be changed with the indication information carrying information about the period, to meet actual needs or parameter requirements.

Embodiment 1: Periodic Mode 1

Figure 3:
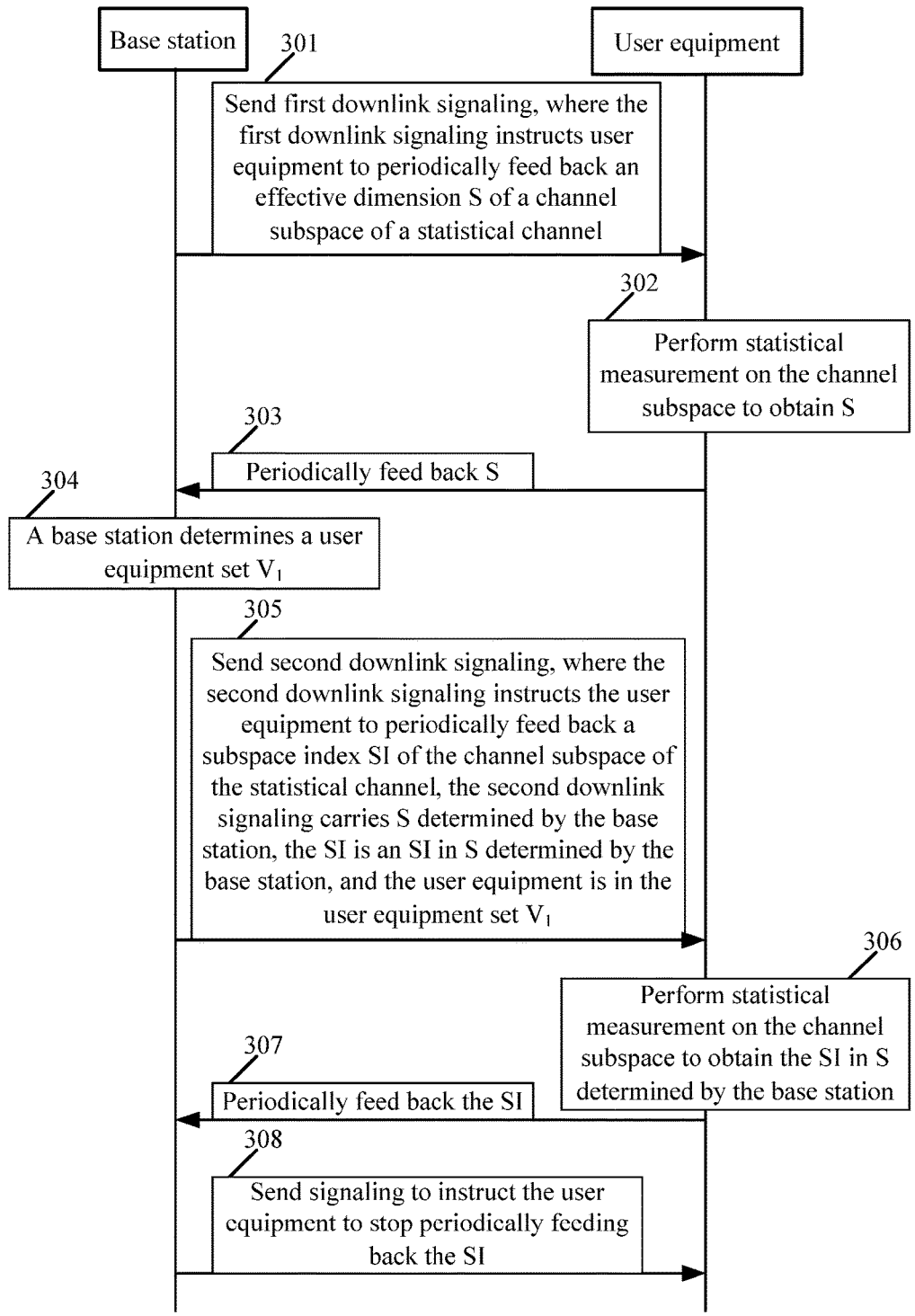
FIG. 3 is a method for obtaining and feeding back channel state information according to Embodiment 1 of the present disclosure.

FIG. 3 is a method for obtaining and feeding back channel state information according to Embodiment 1 of the present disclosure, as shown in FIG. 3.

Step 301: A BS sends first downlink signaling to UE, where the first downlink signaling instructs the UE to periodically feed back S determined by the UE.

Step 302: The UE performs statistical measurement on a channel subspace to obtain S.

Step 303: The UE periodically feeds back S to the BS.

Step 304: The BS determines to-be-scheduled UE, or the BS determines a user equipment set, where all UEs in the user equipment set are to-be-scheduled UEs.

Step 305: The BS sends second downlink signaling to the to-be-scheduled UE, where the second downlink signaling instructs the to-be-scheduled UE to periodically feedback an SI. Further, the second downlink signaling carries S determined by the BS (the BS determines, according to S fed back by the UE, S that meets channel conditions or actual needs, where S determined by the BS may be the same as or different from S determined by the UE). In this case, the SI fed back by the UE is an SI when a dimension of a precoding matrix of the channel subspace is S determined by the BS (or referred to as an SI in S determined by the BS). Further, the second downlink signaling may carry several S's determined by the BS, which is equivalent to that the second downlink signaling instructs the to-be-scheduled UE to feed back several SIs in the several S's determined by the BS. Further, the several S's determined by the BS may be encoded or indexed, and only an encoded code word or an index needs to be sent to the to-be-scheduled UE.

Step 306: The UE performs measurement on the channel subspace of a statistical channel to obtain an SI in S determined by the BS.

Step 307: The UE periodically feeds back the SI to the BS.

Step 308: When the UE is not required to feed back the SI, the BS sends signaling to instruct the to-be-scheduled UE to stop feeding back the SI. Further, the BS may send signaling to instruct the UE to stop feeding back an effective dimension S of the channel subspace, or may agree with the UE on stopping the feedback.

Optionally, a period of the periodic feedback may be pre-agreed, or may be dynamically specified by an index of an interval in the first downlink signaling. The first downlink signaling and the second downlink signaling may be UE-specific or cell-specific.

Embodiment 2: Periodic Mode 2

Figure 4:
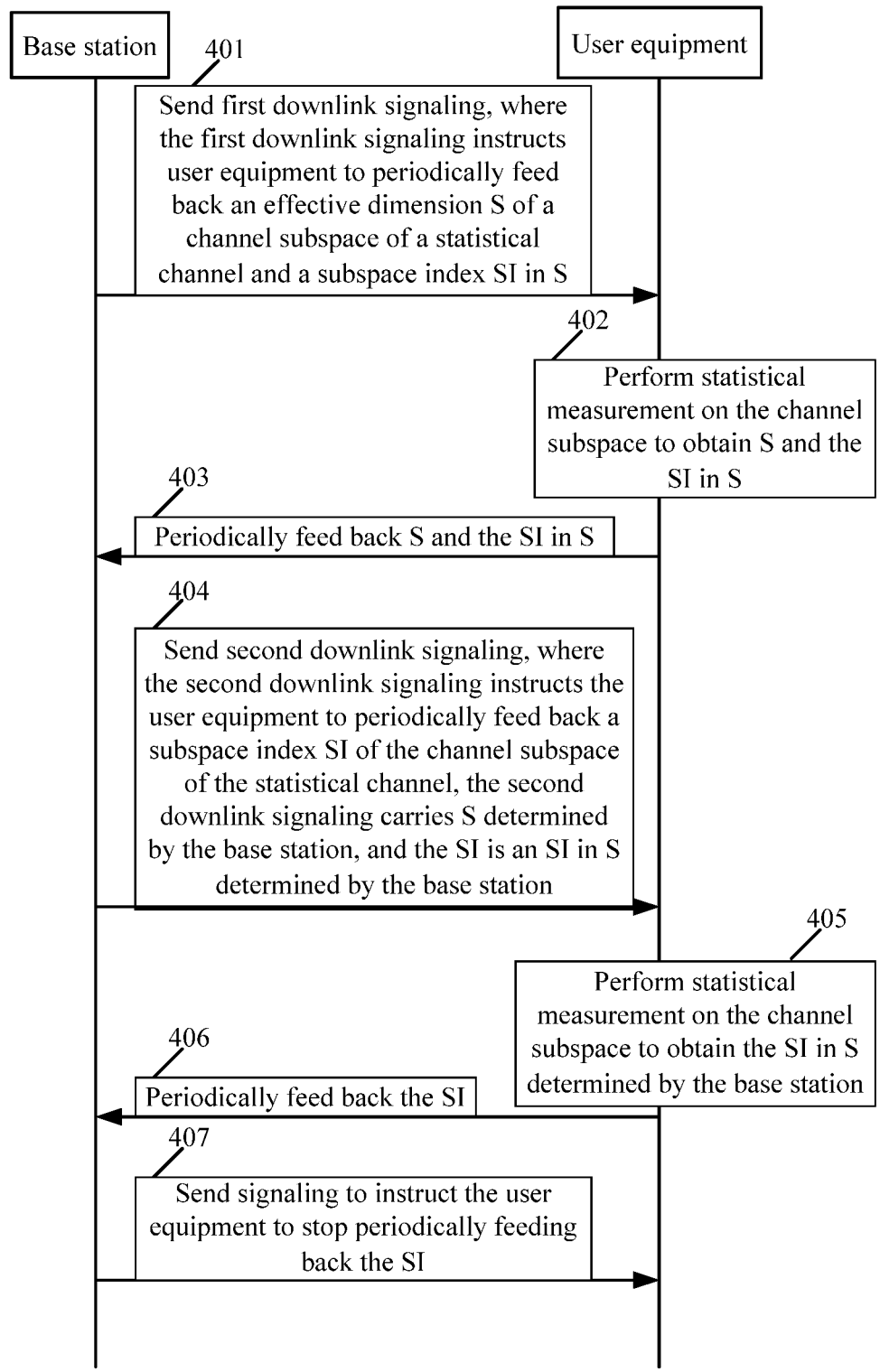
FIG. 4 is a method for obtaining and feeding back channel state information according to Embodiment 2 of the present disclosure.

FIG. 4 is a method for obtaining and feeding back channel state information according to Embodiment 2 of the present disclosure, as shown in FIG. 4.

Step 401: A BS sends first downlink signaling to UE, where the first downlink signaling instructs the UE to periodically feed back S and an SI in S.

Step 402: The UE performs statistical measurement on a channel subspace to obtain S and the SI in S.

Step 403: The UE periodically feeds back S and the SI in S to the BS.

Optionally, step 404: The BS sends second downlink signaling to the UE, where the second downlink signaling instructs the UE to periodically feed back the SI. Further, the second downlink signaling carries S determined by the BS (the BS determines, according to S and the SI that are fed back by the UE, S that meets channel conditions or actual needs, where S determined by the BS may be the same as or different from S determined by the UE). In this case, the SI fed back by the UE is an SI when a dimension of a precoding matrix of the channel subspace is S determined by the BS (or referred to as an SI in S determined by the BS). Further, the second downlink signaling may carry several S's determined by the BS, which is equivalent to that the second downlink signaling instructs to-be-scheduled UE to feed back several SIs in the several S's determined by the BS. Further, the several S's determined by the BS may be encoded or indexed, and only an encoded code word or an index needs to be sent to the to-be-scheduled UE.

Optionally, step 405: The UE performs measurement on the channel subspace of a statistical channel to obtain an SI in S determined by the BS.

Optionally, step 406: The UE periodically feeds back the SI to the BS.

Optionally, step 407: When the UE is not required to feed back S and the SI, the BS sends signaling to the UE to instruct the UE to stop feeding back S and the SI.

Optionally, a period of the periodic feedback may be pre-agreed, or may be dynamically specified by an index of an interval in the first downlink signaling. The first downlink signaling and the second downlink signaling may be UE-specific or cell-specific.

In Embodiment 2 of the present disclosure, the BS may directly use S and the SI that are fed back by the UE as obtained channel state information. Optionally, the BS may more accurately determine, according to S and the SI that are first fed back by the UE, S that matches the channel subspace, and then may send the second downlink signaling to instruct the UE to periodically feed back the SI in S determined by the BS. If S fed back by the UE in step 403 is the same as S determined by the BS, the second downlink signaling may not instruct the UE to periodically feed back the SI, but notifies the UE of only S determined by the BS.

Embodiment 3: Trigger Mode 1

Figure 5:
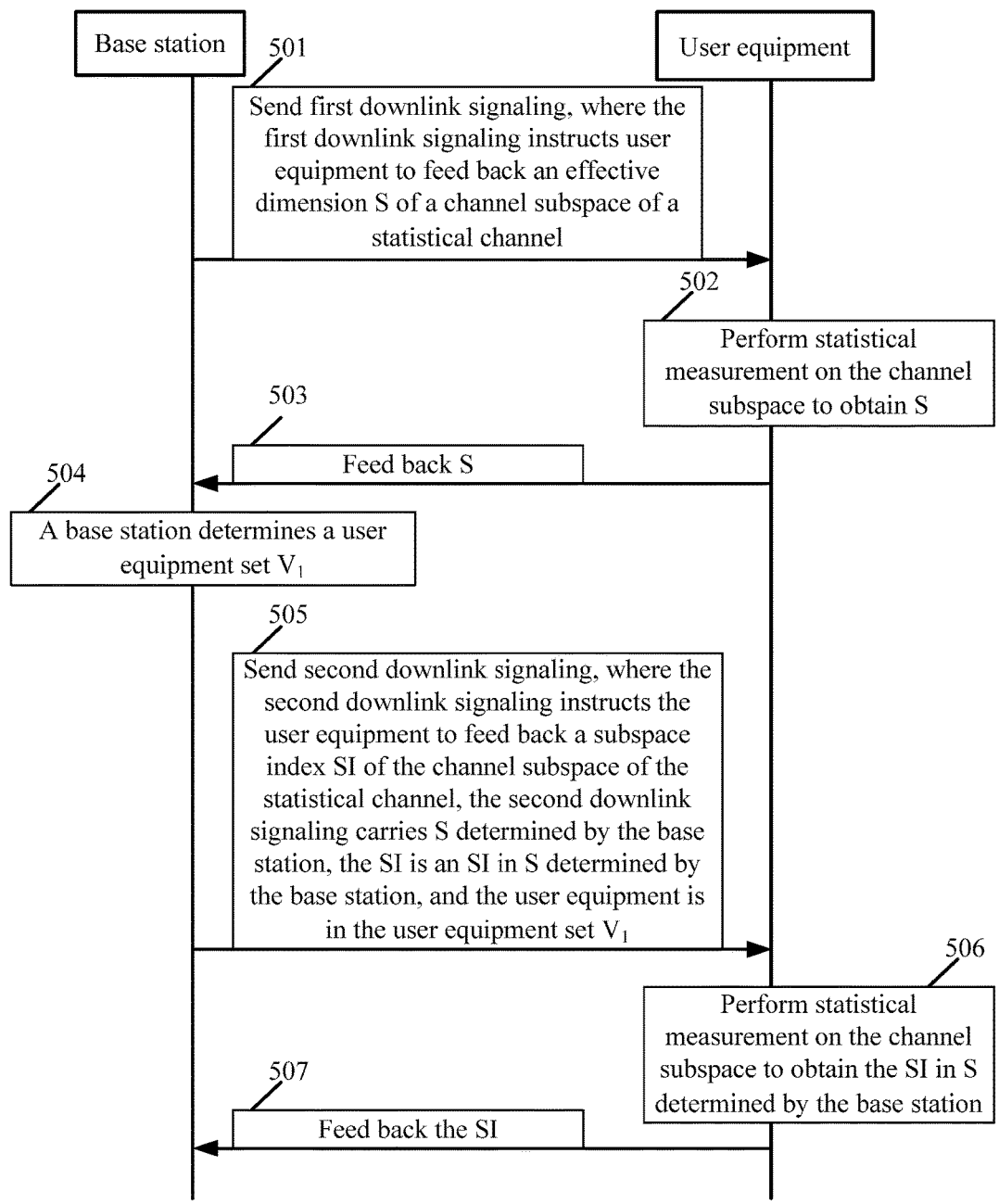
FIG. 5 is a method for obtaining and feeding back channel state information according to Embodiment 3 of the present disclosure.

FIG. 5 is a method for obtaining and feeding back channel state information according to Embodiment 3 of the present disclosure, as shown in FIG. 5.

Steps in this embodiment are basically the same as the steps in Embodiment 1, except that a BS does not instruct UE to periodically feed back S or an SI. In this way, the UE does not periodically feed back S or the SI either, but feeds back S or the SI at a time or with a trigger of downlink signaling.

Step 501: A BS sends first downlink signaling to UE, where the first downlink signaling instructs the UE to feed back S determined by the UE.

Step 502: The UE performs statistical measurement on a channel subspace to obtain S.

Step 503: The UE feeds back S to the BS.

Step 504: The BS determines to-be-scheduled UE, or the BS determines a user equipment set, where all UEs in the user equipment set are to-be-scheduled UEs.

Step 505: The BS sends second downlink signaling to the to-be-scheduled UE, where the second downlink signaling instructs the to-be-scheduled UE to feed back an SI. Further, the second downlink signaling carries S determined by the BS (the BS determines, according to S fed back by the UE, S that meets channel conditions or actual needs, where S determined by the BS may be the same as or different from S determined by the UE). In this case, the SI fed back by the UE is an SI when a dimension of a precoding matrix of the channel subspace is S determined by the BS (or referred to as an SI in S determined by the BS). Further, the second downlink signaling may carry several S's determined by the BS, which is equivalent to that the second downlink signaling instructs the to-be-scheduled UE to feedback several SIs in the several S's determined by the BS. Further, the several S's determined by the BS may be encoded or indexed, and only an encoded code word or an index needs to be sent to the to-be-scheduled UE.

Step 506: The UE performs measurement on the channel subspace of a statistical channel to obtain an SI in S determined by the BS.

Step 507: The UE feeds back the SI to the BS.

Optionally, the feedback in this embodiment may be performed aperiodically, may be performed at a time, or may be triggered by using the first downlink signaling. The first downlink signaling and the second downlink signaling may be UE-specific or cell-specific.

Embodiment 4: Trigger Mode 2

Figure 6:
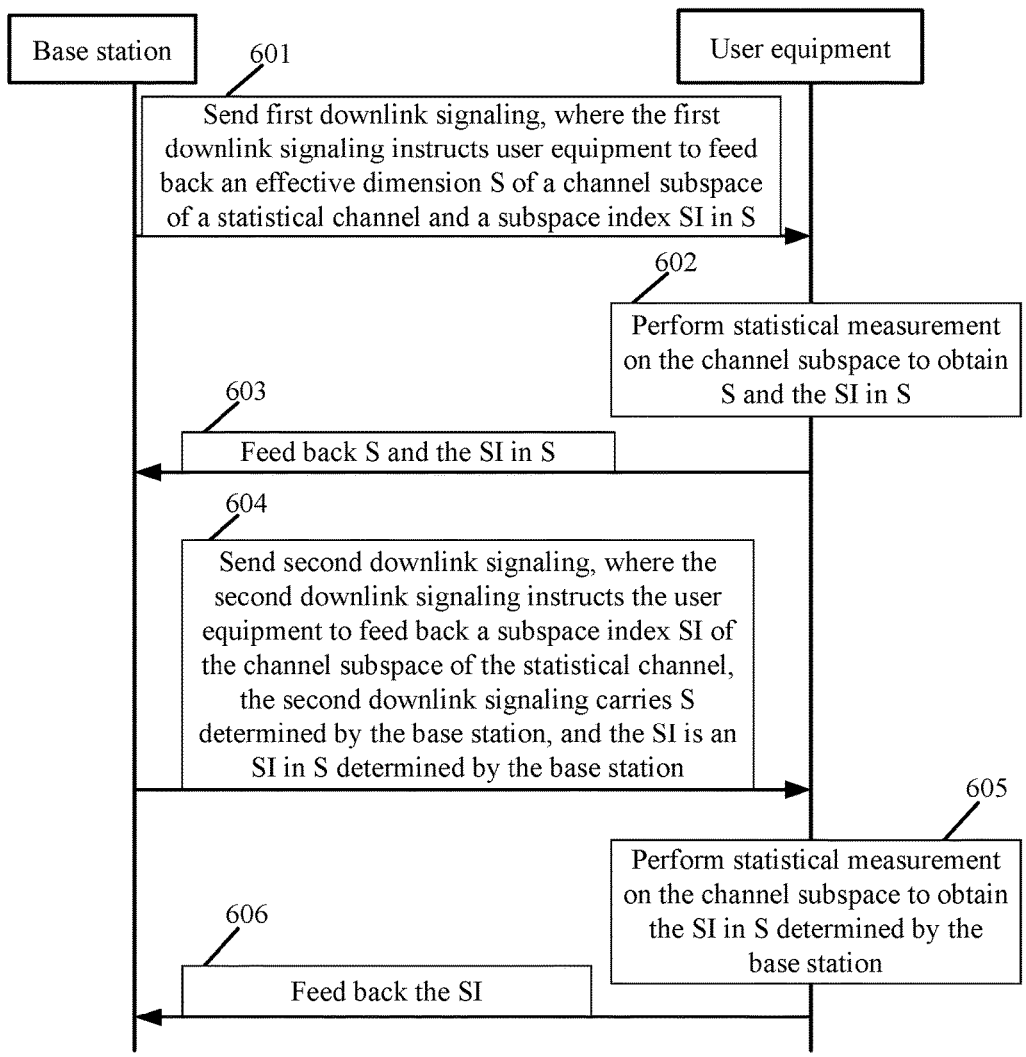
FIG. 6 is a method for obtaining and feeding back channel state information according to Embodiment 4 of the present disclosure.

FIG. 6 is a method for obtaining and feeding back channel state information according to Embodiment 4 of the present disclosure, as shown in FIG. 6.

Steps in this embodiment are basically the same as the steps in Embodiment 2, except that a BS does not instruct UE to periodically feed back S or an SI. In this way, the UE does not periodically feed back S or the SI either, but feeds back S or the SI at a time or with a trigger of downlink signaling.

Step 601: A BS sends first downlink signaling to UE, where the first downlink signaling instructs the UE to feed back S and an SI in S. Optionally, the feedback in this embodiment may be performed aperiodically, may be performed at a time, or may be triggered by using the first downlink signaling. The first downlink signaling may be UE-specific or cell-specific.

Step 602: The UE performs statistical measurement on a channel subspace to obtain S and the SI in S.

Step 603: The UE feeds back S and the SI in S to the BS.

Optionally, step 604: The BS sends second downlink signaling to the UE, where the second downlink signaling instructs the UE to feed back the SI. Further, the second downlink signaling carries S determined by the BS (the BS determines, according to S and the SI that are fed back by the UE, S that meets channel conditions or actual needs, where S determined by the BS may be the same as or different from S determined by the UE). In this case, the SI fed back by the UE is an SI when a dimension of a precoding matrix of the channel subspace is S determined by the BS (or referred to as an SI in S determined by the BS). Further, the second downlink signaling may carry several S's determined by the BS, which is equivalent to that the second downlink signaling instructs to-be-scheduled UE to feed back several SIs in the several S's determined by the BS. Further, the several S's determined by the BS may be encoded or indexed, and only an encoded code word or an index needs to be sent to the to-be-scheduled UE.

Optionally, step 605: The UE performs measurement on the channel subspace of a statistical channel to obtain an SI in S determined by the BS.

Optionally, step 606: The UE back feeds the SI to the BS.

Optionally, the feedback in this embodiment may be performed aperiodically, may be performed at a time, or may be triggered by using the first downlink signaling. The first downlink signaling and the second downlink signaling may be UE-specific or cell-specific.

In Embodiment 4 of the present disclosure, the BS may directly use S and the SI that are fed back by the UE as obtained channel state information. Optionally, the BS may more accurately determine, according to S and the SI that are first fed back by the UE, S that matches the channel subspace, and then may send the second downlink signaling to instruct the UE to feed back the SI in S determined by the BS. If S fed back by the UE in step 603 is the same as S determined by the BS, the second downlink signaling may not instruct the UE to periodically feed back the SI, but notifies the UE of only S determined by the BS.

In this embodiment of the present disclosure, periodically feeding back S or aperiodically feeding back the SI (for example, step 303 or step 307) is not limited to being performed before or after other steps. Because the feedback is periodic and may last a relatively long time, the UE may still be feeding back S after, for example, step 304 or step 305 (that is, step 303 is still being performed). In addition, it is not necessary to instruct to stop feeding back S or the SI, and step 308 is optional. Moreover, in this embodiment of the present disclosure, the BS may send the first downlink signaling to one or more UEs (which may be all UEs in a cell, or may be a group of UEs). However, in the step of determining to-be-scheduled UE (for example, step 304), the BS determines the to-be-scheduled UE from the one or more UEs, and then the BS sends the second downlink signaling to the determined to-be-scheduled UE. The to-be-determined UE includes a maximum of all of the one or more UEs.

The BS instructs, by adding S determined by the BS to the sent signaling, the UE to feed back the SI corresponding to the precoding matrix, whose dimension is S, of the channel subspace, instead of performing feedback randomly. This reduces feedback overheads. In addition, the BS instructs the to-be-scheduled UE to feed back the SI, and not all UEs are required to feed back the SI. This also reduces the feedback overheads.

According to the method in the foregoing embodiment, after a base station obtains an effective dimension S of a channel subspace and an SI in S, the base station may use the information to perform precoding, beamforming, and the like, and may further use the information to reduce a channel information obtaining amount, for example, perform dimension reduction precoding, so as to reduce pilot overheads and computational complexity for performing channel measurement in a next step.

Specifically, the base station obtains an effective dimension S of a channel subspace of a user and an SI corresponding to S. The effective dimension of the channel subspace is less than (or far less than) a quantity of reference signal ports used to measure channel state information, which is equivalent to that a dimension-reduced channel subspace is obtained.

The base station schedules user equipment, determines a user equipment set that participates in multiple-input multiple-output, and performs next-level channel state information measurement for user equipment in the user equipment set, to obtain real-time channel state information of the dimension-reduced channel subspace.

The base station sends, to the user equipment in the user equipment set, downlink data and a UE-specific demodulation reference signal that are processed by means of two-level precoding. Two-level precoding includes level-1 precoding corresponding to channel state information of a channel subspace and level-2 precoding corresponding to real-time channel state information.

This embodiment of the present disclosure can be applied to a downlink MU-MIMO system when there are large quantities of to-be-scheduled users and users participating in MU-MIMO (typically, in a system including but is not limited to a large-scale antenna array system).

By using the methods provided in the present disclosure, system overheads can be greatly reduced. Specifically:

Assuming that a quantity of transmit antennas is M, a quantity of to-be-scheduled UEs is $T_1$, a quantity of UEs in a set of scheduled UEs is $T_2$, and a quantity of antennas of UE is N, overheads for obtaining CSI are effectively reduced by means of channel dimension reduction in this embodiment of the present disclosure, and reduced overheads include the following overheads (a level-1 RS solution in LTE in the prior art is compared with the solution of the present disclosure to reflect effects):

a. Downlink RS Overheads (Applicable to FDD/TDD):

In the level-1 RS solution in LTE in the prior art, if density of each transmit antenna in terms of time and frequency is x REs/ms/15 kHz on average, total density of RSs of the M transmit antennas is M*x REs/ms/15 kHz.

However, downlink RS overheads in this embodiment of the present disclosure include two parts: overheads of two levels of RSs. If only a channel subspace that changes slowly in terms of both time and frequency needs to be obtained for a level-1 RS, density in both a time domain and a frequency domain can be reduced (for example, time density may be below ¼ of density of the level-1 RS in LTE, and in terms of frequency, ½ of density of the level-1 RS in LTE is considered), and density of the M transmit antennas can be generally controlled at M*x/8 REs/ms/15 kHz. If feedback of a real-time channel change needs to be supported for a level-2 RS, density of each spatial dimension in terms of time and frequency is also×REs/ms/15 kHz on average, and a dimension-reduced dimension S is generally equal to M/4; therefore density of an S-dimensional spatial antenna is a maximum of M*x/4 REs/ms/15 kHz.

Therefore, in terms of the downlink RS overheads, RE overheads are reduced by 1−(M*x/4+M*x/8)/M*x=62.5% when the solution of the present disclosure is compared with the level-1 RS solution in LTE in the prior art.

b. Uplink Feedback Overheads (Applicable to FDD/TDD, and Assuming that Feedback is Performed Once at Each Downlink Sub-Band):

In the level-1 RS solution in LTE in the prior art, scheduling needs to be performed on all of the $T_1$ to-be-scheduled UEs. Assuming that time density of a quantity of REs occupied by feedback of each to-be-scheduled UE is y REs/ms/downlink sub-band, total time density of a quantity of REs occupied by the $T_1$ to-be-scheduled UEs is $T_1*y$ REs/ms/downlink sub-band.

However, in this embodiment of the present disclosure, feedback needs to be performed only for $T_2$ UEs in the set of scheduled UEs. Assuming that a quantity of REs occupied by the feedback of each to-be-scheduled UE is consistent with that in the level-1 RS solution in LTE, total time density of a quantity of REs occupied by the $T_2$ UEs in the set of scheduled UEs is $T_2*y$ REs/ms/downlink sub-band. Even in a conservative case, $T_2/T_1 \leq 1/4$.

Therefore, in terms of the uplink feedback overheads, RE overheads are reduced by $1-T_2*y/(T_1*y)=75\%$ when the solution of the present disclosure is compared with the level-1 RS solution in LTE in the prior art.

c. Uplink RS Overheads (Only Applicable to TDD)

In the level-1 RS solution in LTE in the prior art, all of the $T_1$ to-be-scheduled UEs need to send an uplink RS, and in terms of time and frequency, if density of a quantity of REs that are occupied by each to-be-scheduled UE for sending an RS is z REs/ms/15 kHz on average, and total density of RSs of the $T_1$ to-be-scheduled UEs is $T_1*z$ REs/ms/15 kHz.

However, the uplink RS overheads in this embodiment of the present disclosure include two parts: overheads of two levels of RSs. If only a channel subspace that changes slowly in terms of both time and frequency needs to be obtained for a level-1 RS, density in both a time domain and a frequency domain can be reduced (for example, time density may be below 1/4 of density of the level-1 RS in LTE, and in terms of frequency, 1/2 of density of the level-1 RS in LTE is considered), and density of RSs of the $T_1$ to-be-scheduled UEs can be generally controlled at $T_1*z/8$ REs/ms/15 kHz. If feedback of a real-time channel change needs to be supported for a level-2 RS, density of each UE in the set of scheduled UEs in terms of time and frequency is also z REs/ms/15 kHz on average; therefore, density of level-2 RSs of the $T_2$ UEs in the set of scheduled UEs is a maximum of $T_2*z/4$ REs/ms/15 kHz. Even in a conservative case, $T_2/T_1 \leq 1/4$.

Therefore, in terms of the uplink RS overheads, RE overheads are reduced by $1-(T_2*z+T_1*z/8)/(T_1*z)=62.5\%$ when the solution of the present disclosure is compared with the level-1 RS solution in LTE in the prior art.

It may further be understood that, after channel dimension reduction in this embodiment of the present disclosure is performed, computational complexity for obtaining level-2 precoding decreases at a speed of a power of 3. For example, an antenna array with 256 antenna elements is reduced to 32 dimensions, computational complexity can be reduced by $8^3=512$ times, and a corresponding processing delay is also reduced by 512 times, which are specifically shown in the following table:

| | Dimension reduction not performed on an antenna array with 256 antenna elements | Antenna array with 256 antenna elements dimension-reduced to a 32-dimension beam space |
| --- | --- | --- |
| Precoding computational complexity | 163840 Gflops (Giga floating-point operations per second) | 320 Gflops |

An update speed of the level-1 precoding is quite slow, and is not a main bottleneck in resolving computational complexity. Therefore, obtaining SVD of the level-2 precoding is main computational complexity for obtaining DL CSI. In the foregoing table, when an antenna array is reduced to 32 dimensions, a computation result is $27*32^3*6*100*3*1e3/5=320$ Gflops, where $27*32^3$ is SVD complexity at each sub-band, 6 is a quantity, of multiply-add operations performed on real numbers, required in a multiply operation performed on complex numbers, 100 is a quantity of sub-bands (with a 100 MHz system bandwidth), 3 is a quantity of sectors, and 1e3/5 is a quantity of times for obtaining level-2 CSI within one second.

It should be noted that, from a perspective of system performance, there is a quite small difference between performance in this embodiment of the present disclosure and ideal system performance. With reference to data effect diagrams, shown in FIG. 7 to FIG. 11, of comparison between system performance in the present disclosure and ideal system performance, the following uses MU-MIMO as an example for description in terms of a bit error rate (BER) and a signal-to-noise ratio SNR (dB).

Figure 7:
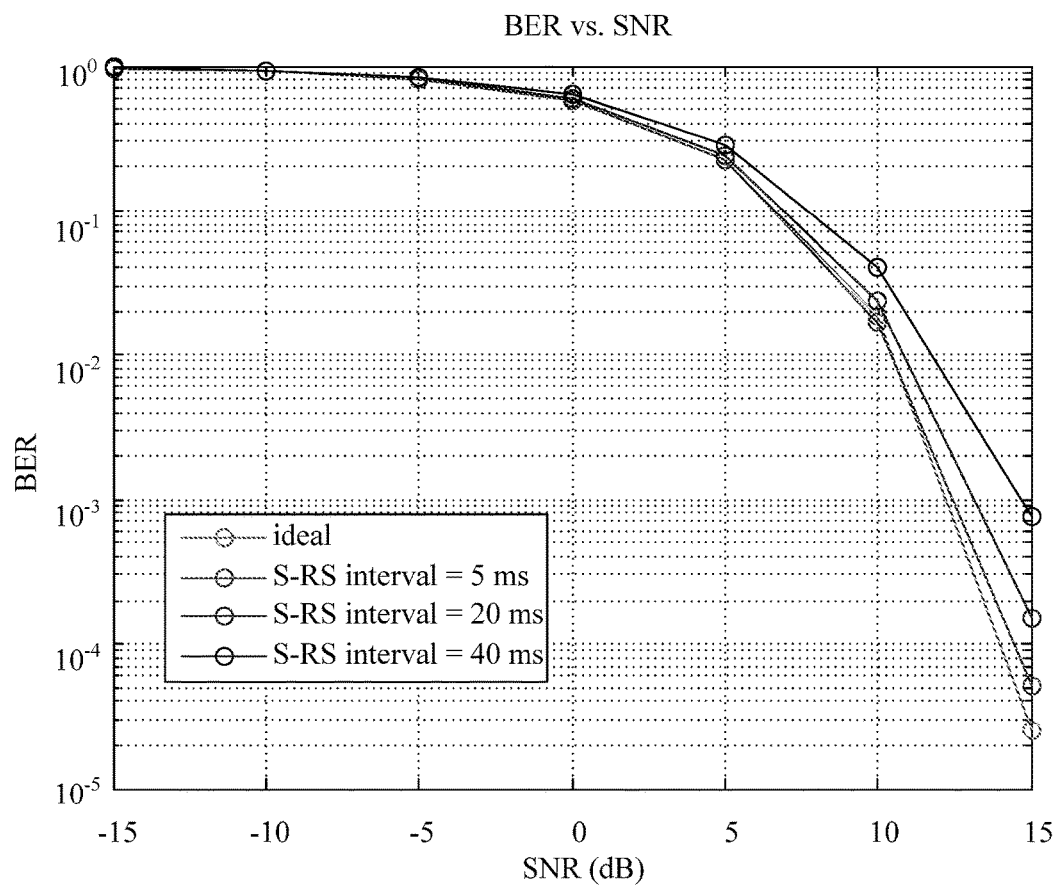
FIG. 7 is a data effect diagram of comparison between system performance in the present disclosure and ideal system performance.

According to a data effect diagram, shown in FIG. 7, of comparison between system performance in the present disclosure and ideal system performance, when a period of sending a level-1 RS changes, there is always a quite small difference between the system performance in the present disclosure and the ideal system performance.

Figure 8:
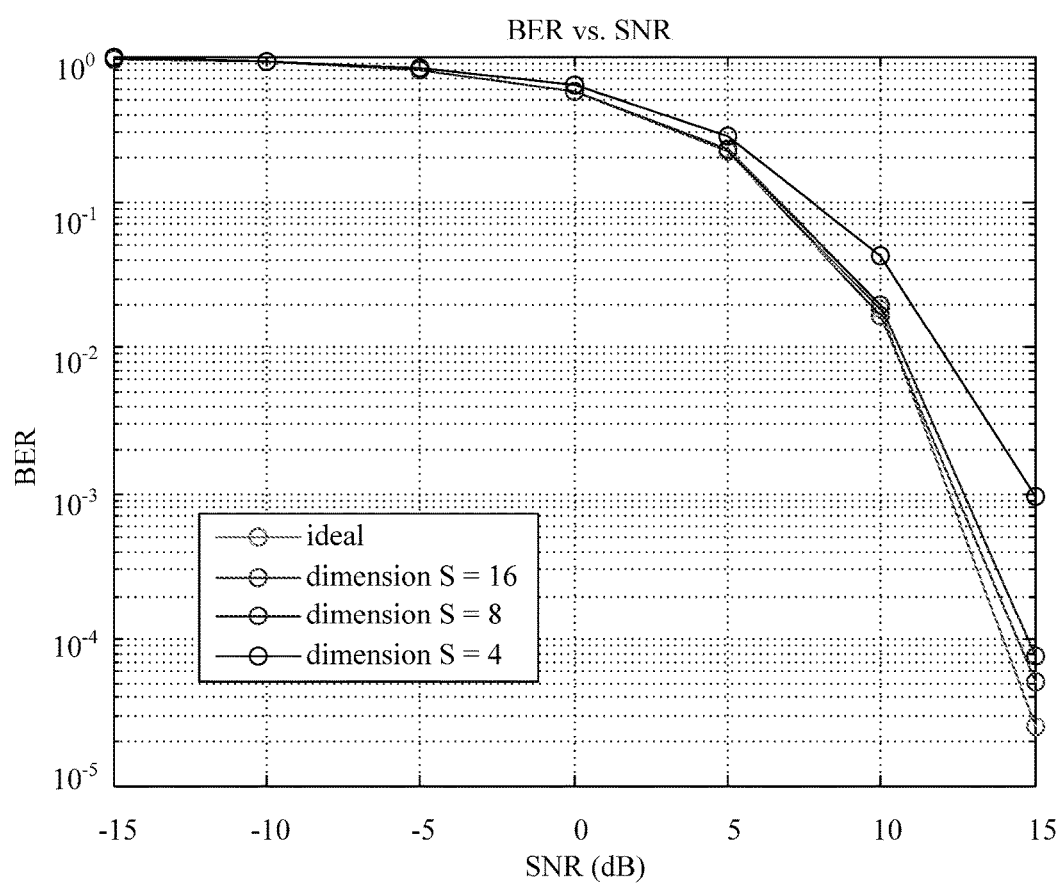
FIG. 8 is another data effect diagram of comparison between system performance in the present disclosure and ideal system performance.

According to another data effect diagram, shown in FIG. 8, of comparison between system performance in the present disclosure and ideal system performance shown in FIG. 8, when a dimension in dimension reduction changes, there is always a quite small difference between the system performance in the present disclosure and the ideal system performance.

Figure 9:
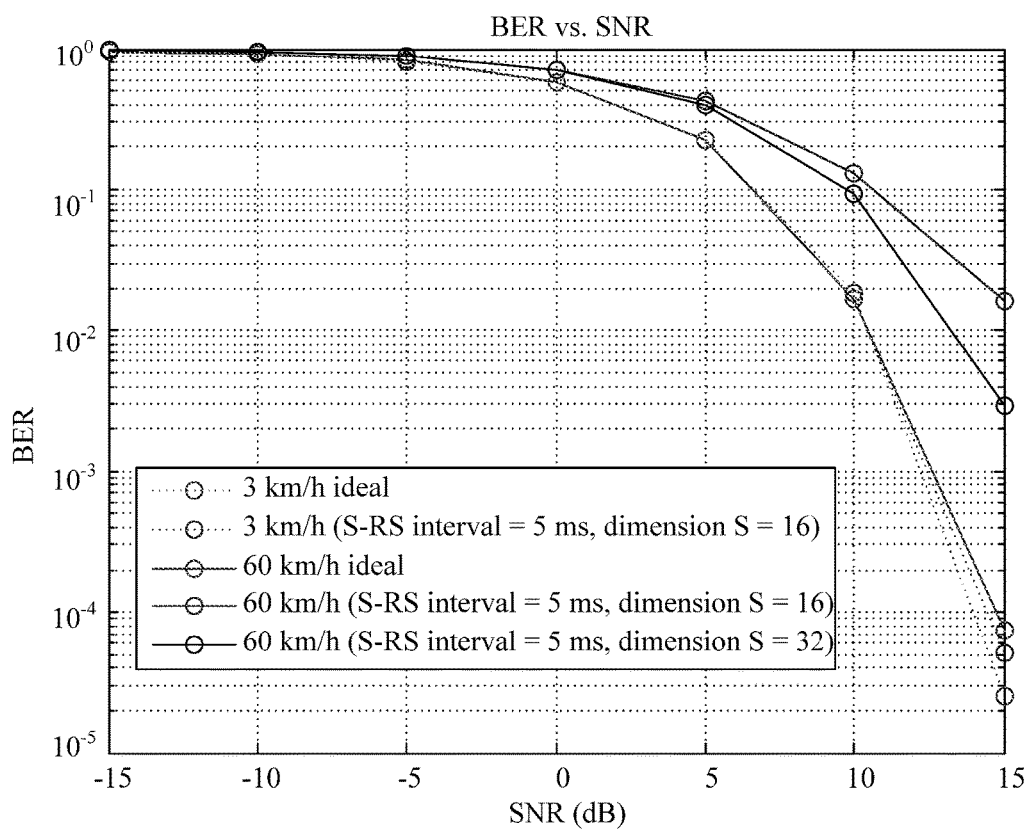
FIG. 9 is another data effect diagram of comparison between system performance in the present disclosure and ideal system performance.

According to another data effect diagram, shown in FIG. 9, of comparison between system performance in the present disclosure and ideal system performance, when UE mobility changes, there is a quite small difference between system performance at a low speed in the present disclosure and the ideal system performance, but there is a relatively large difference between system performance at a medium/high speed and the ideal system performance (that is, there is a relatively large loss in the system performance at the medium/high speed in the present disclosure). Therefore, the present disclosure is mainly applicable to a low-speed scenario.

Figure 10:
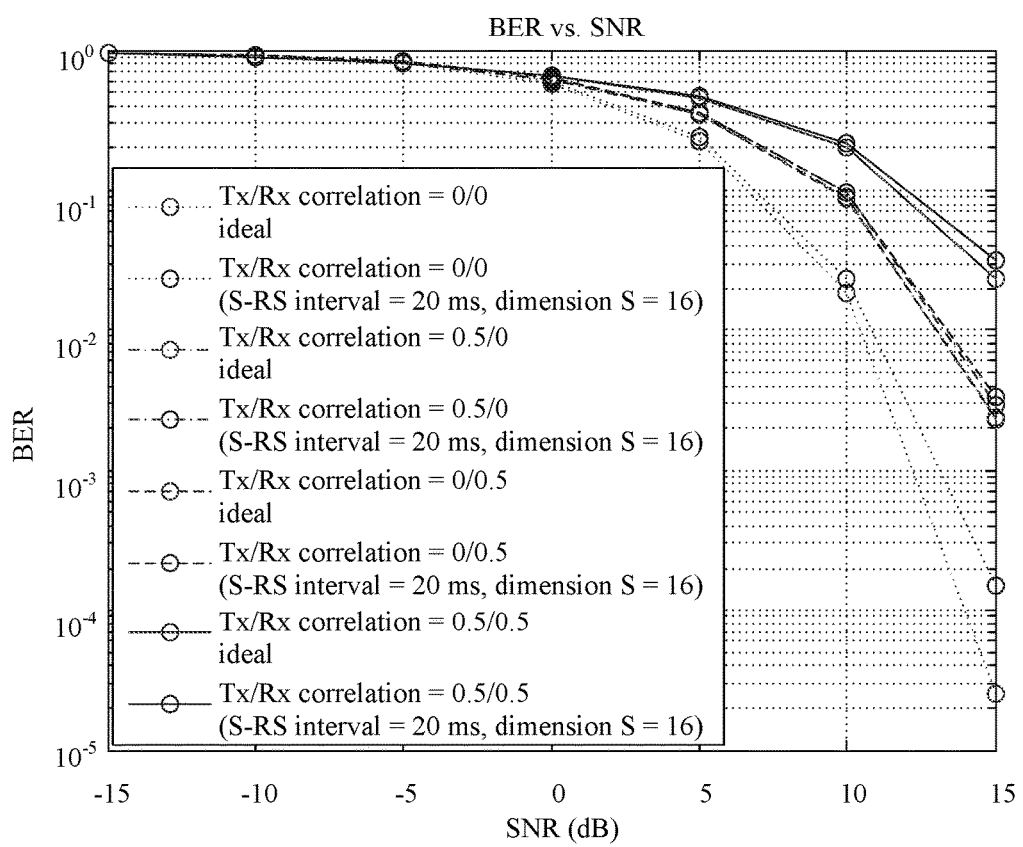
FIG. 10 is another data effect diagram of comparison between system performance in the present disclosure and ideal system performance.

According to another data effect diagram, shown in FIG. 10, of comparison between system performance in the present disclosure and ideal system performance, when correlation between a data transmit end and a data receive end changes, there is always a quite small difference between the system performance in the present disclosure and the ideal system performance.

Figure 11:
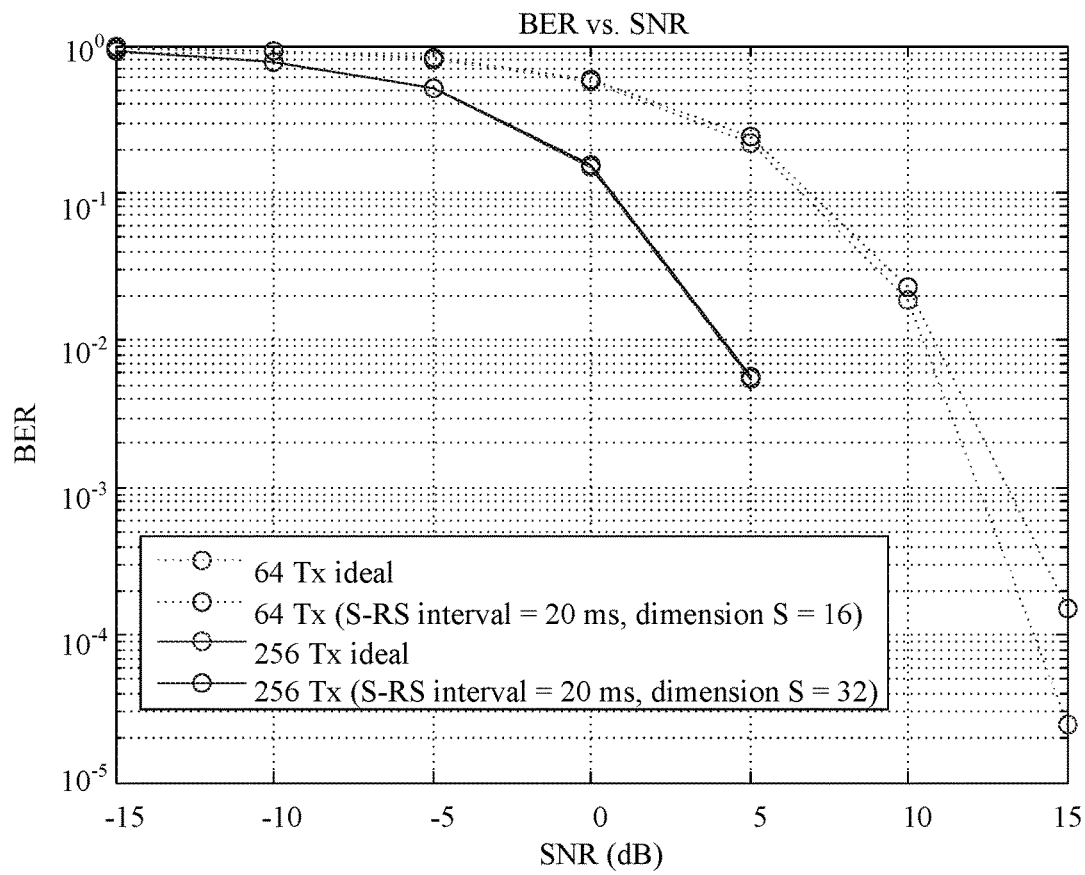
FIG. 11 is another data effect diagram of comparison between system performance in the present disclosure and ideal system performance.

According to another data effect diagram, shown in FIG. 11 of comparison between system performance in the present disclosure and ideal system performance, when a quantity of transmit antennas at a data transmit end changes (the quantity of antennas is greater than or equal to 64), there is always a quite small difference between the system performance in the present disclosure and the ideal system performance.

By implementing this embodiment of the present disclosure, channel state information of a dimension-reduced channel subspace is obtained by means of level-1 channel state information measurement, level-2 channel state information measurement is performed for user equipment in a user equipment set to obtain state information of a dimension-reduced real-time channel, and downlink data and a UE-specific demodulation reference signal are processed by means of two-level precoding and then sent. This resolves a technical problem in the prior art that uplink and downlink pilot overheads are large and a quantity of uplink CSI feedbacks is large when a quantity of antennas at a data transmit end is relatively large (a quantity of to-be-served UEs is also relatively large), so that more time-frequency resources in a system are available for data transmission, and a system throughput is effectively increased. In addition, by means of channel dimension reduction, a problem of high complexity for baseband processing in a system in the prior art can be resolved, thereby reducing requirements for a baseband processing capability.

Figure 12:
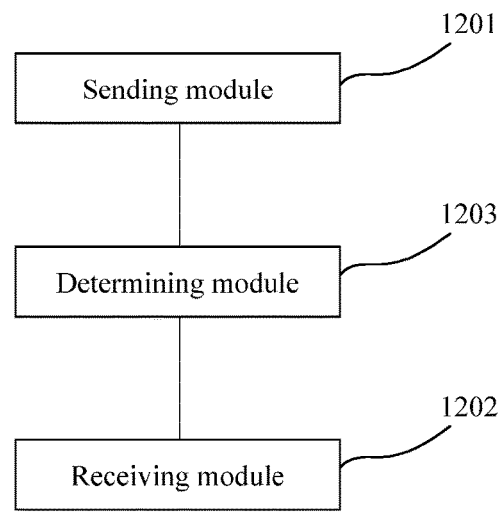
FIG. 12 is an apparatus for obtaining channel state information according to an embodiment of the present disclosure.

Corresponding to the foregoing method embodiments, an embodiment of the present disclosure further provides an apparatus for obtaining channel state information. Referring to FIG. 12, the apparatus includes a sending module 1201 and a receiving module 1202.

The sending module 1201 is configured to send, by a base station, one or multiple pieces of downlink signaling to user equipment, where the one or multiple pieces of downlink signaling instruct the user equipment to feed back channel dimension information.

The channel dimension information includes an effective dimension of a channel subspace of a statistical channel between the base station and the user equipment, and the effective dimension of the channel subspace is less than a quantity of reference signal ports used to measure channel state information.

The receiving module 1202 is configured to receive, by the base station, the channel dimension information fed back by the user equipment.

The channel dimension information further includes a subspace index in the effective dimension of the channel subspace, and the subspace index is in a one-to-one correspondence with a quantized precoding matrix of eigenvectors of the channel subspace.

Further, the quantized precoding matrix, corresponding to the subspace index, of the eigenvectors of the channel subspace includes partial energy of the statistical channel.

Optionally, the sending, by a base station, one piece of downlink signaling to user equipment includes sending, by the base station, third downlink signaling to the user equipment.

The third downlink signaling instructs the user equipment to feedback the effective dimension of the channel subspace and the subspace index in the effective dimension of the channel subspace.

The receiving, by the base station, the channel dimension information fed back by the user equipment includes receiving the effective dimension of the channel subspace and the subspace index in the effective dimension of the subspace that are fed back by the user equipment.

Further, the apparatus further includes a determining module 1203.

The determining module 1203 is configured to determine, by the base station, an effective dimension of the channel subspace according to the effective dimension of the channel subspace and the subspace index that are fed back by the user equipment.

The sending module 1201 is further configured to send, by the base station, fourth downlink signaling to the user equipment, where the fourth downlink signaling instructs the user equipment to feedback a subspace index in the effective dimension of the channel subspace that is determined by the base station.

The receiving module 1202 is further configured to receive, by the base station, the subspace index that is fed back by the user equipment and that is in the effective dimension of the channel subspace that is determined by the base station.

Some technical features involved, for example, an effective dimension of a channel subspace, a subspace index, a statistical channel, periodic feedback, one-time feedback, are similar or corresponding to some technical features in the method embodiments of the present disclosure, and details are not repeatedly described in this embodiment.

The apparatus for obtaining channel state information according to this embodiment of the present disclosure may be applied to a network element node device or a base station.

Figure 13:
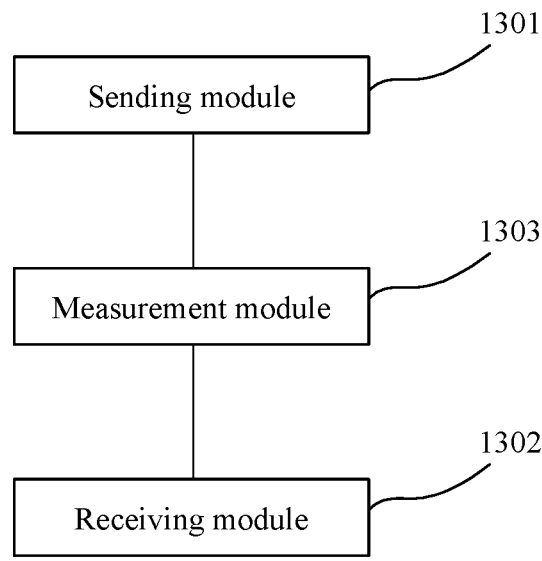
FIG. 13 is an apparatus for feeding back channel state information according to an embodiment of the present disclosure.

Corresponding to the foregoing method embodiments, an embodiment of the present disclosure further provides an apparatus for feeding back channel state information. Referring to FIG. 13, the apparatus includes a receiving module 1301 and a feedback module 1302.

The receiving module 1301 is configured to receive, by user equipment, one or multiple pieces of downlink signaling from a base station, where the one or multiple pieces of downlink signaling instruct the user equipment to feed back channel dimension information.

The channel dimension information includes an effective dimension of a channel subspace of a statistical channel between the base station and the user equipment, and the effective dimension of the channel subspace is less than a quantity of reference signal ports used to measure channel state information.

The feedback module 1302 is configured to feed back, by the user equipment, the channel dimension information to the base station.

The channel dimension information further includes a subspace index in the effective dimension of the channel subspace, and the subspace index is in a one-to-one correspondence with a quantized precoding matrix of eigenvectors of the channel subspace.

Further, the quantized precoding matrix, corresponding to the subspace index, of the eigenvectors of the channel subspace includes partial energy of the statistical channel.

Optionally, the apparatus further includes a measurement module 1303, configured to perform, by the user equipment, statistical measurement on the channel subspace to obtain the effective dimension of the channel subspace.

Some technical features involved, for example, an effective dimension of a channel subspace, a subspace index, a statistical channel, periodic feedback, one-time feedback, are similar or corresponding to some technical features in the method embodiments of the present disclosure, and details are not repeatedly described in this embodiment.

The apparatus for feeding back channel state information according to this embodiment of the present disclosure may be applied to a network element node device or user equipment.

Figure 14:
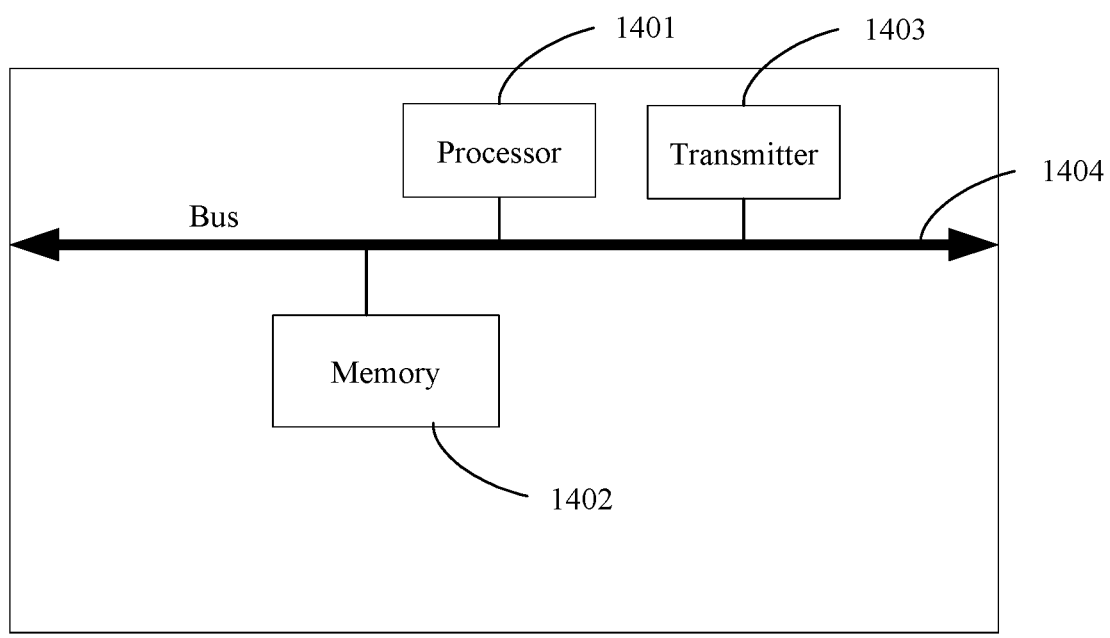
FIG. 14 is a device for obtaining or feeding back channel state information according to an embodiment of the present disclosure.

An embodiment of the present disclosure further provides a processing device. Referring to FIG. 14, the device includes a processor 1401, a memory 1402, a transmitter 1403, and a bus 1404. The processor 1401, the memory 1402, and the transmitter 1403 are connected by using the bus 1404, to transmit data. The memory 1402 is configured to store data processed by the processor 1401.

The bus 1404 may be an Industry Standard Architecture (ISA) bus, a Peripheral Component Interconnect (PCI) bus, an Extended Industry Standard Architecture (EISA) bus, or the like. This is not limited herein. The bus 1404 may be classified into an address bus, a data bus, a control bus, and the like. For ease of representation, the bus 1404 is represented by using only one bold line in FIG. 14; however, it does not indicate that there is only one bus or only one type of bus.

The memory 1402 is configured to store data or executable program code, where the program code includes a computer operation instruction, and may specifically be an operating system, an application program, and the like. The memory 1402 may include a high speed RAM memory, and may further include a non-volatile memory, for example, at least one magnetic disk memory.

The processor 1401 may be a central processing unit (CPU) or an application-specific integrated circuit (ASIC), or may be configured as one or more integrated circuits for implementing this embodiment of the present disclosure.

The processor 1401 is configured to implement, by executing the program code in the memory 1402, the method for obtaining channel state information according to the foregoing embodiment. The processor 1401 may be further configured to implement, by executing the program code in the memory 1402, the method for feeding back channel state information according to the foregoing embodiment. Some technical features involved, for example, an effective dimension of a channel subspace, a subspace index, a statistical channel, periodic feedback, one-time feedback, are similar or corresponding to some technical features in the method embodiments of the present disclosure, and details are not repeatedly described in this embodiment. A specific process is not repeatedly described either.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, and units, or may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit. Specifically, the integrated unit may be implemented by using software in combination with necessary universal hardware. The universal hardware includes a universal integrated circuit, a universal CPU, a universal digital signal processor (DSP), a field programmable gate array (FPGA), a programmable logical device (PLD), a universal memory, a universal component, and the like. Certainly, the integrated unit may be implemented by using dedicated hardware, including an application-specific integrated circuit (ASIC), a dedicated CPU, a dedicated memory, a dedicated component, and the like.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Software or an instruction may be transmitted by using a transmission medium. For example, if software is transmitted from a website, a server or another remote source by using a coaxial cable, an optical fiber/cable, a twisted pair, a digital subscriber line (DSL) or wireless technologies (such as infrared ray, radio and microwave), the coaxial cable, optical fiber/cable, twisted pair, DSL or wireless technologies (such as infrared ray, radio and microwave) are included in definitions of a transmission medium.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for obtaining channel state information, the method comprising:
sending, by a base station, one or multiple pieces of downlink signaling to user equipment for instructing the user equipment to feed back channel dimension information, wherein the channel dimension information comprises an effective dimension of a channel subspace of a statistical channel between the base station and the user equipment and a subspace index in the effective dimension of the channel subspace, wherein the subspace index is in a one-to-one correspondence with a quantized precoding matrix of eigenvectors of the channel subspace, and wherein the effective dimension of the channel subspace is less than a quantity of reference signal ports used to measure channel state information; and
receiving, by the base station, the channel dimension information fed back by the user equipment.

2. The method according to claim 1, wherein the quantized precoding matrix, corresponding to the subspace index, of the eigenvectors of the channel subspace comprises partial energy of the statistical channel.

3. The method according to claim 1, wherein sending the one or multiple pieces of downlink signaling to user equipment comprises: sending, by the base station, first downlink signaling to the user equipment for instructing the user equipment to feed back the effective dimension of the channel subspace;
wherein receiving the channel dimension information fed back by the user equipment comprises: receiving, by the base station, the effective dimension of the channel subspace fed back by the user equipment;
wherein sending the one or multiple pieces of downlink signaling to the user equipment further comprises: sending, by the base station, second downlink signaling to the user equipment for instructing the user equipment to feed back the subspace index, wherein the second downlink signaling carries an effective dimension of the channel subspace determined by the base station according to the effective dimension of the channel subspace fed back by the user equipment; and
wherein receiving the channel dimension information fed back by the user equipment further comprises: receiving, by the base station, a subspace index that is fed back by the user equipment and that is in the effective dimension of the channel subspace that is determined by the base station.

4. The method according to claim 1, wherein sending the one or multiple pieces of downlink signaling to user equipment comprises: sending, by the base station, third downlink signaling to the user equipment for instructing the user equipment to feed back the effective dimension of the channel subspace and the subspace index in the effective dimension of the channel subspace; and
wherein receiving the channel dimension information fed back by the user equipment comprises:receiving, by the base station, the effective dimension of the channel subspace and the subspace index in the effective dimension of the channel subspace fed back by the user equipment.

5. The method according to claim 4, further comprising:
determining, by the base station, an effective dimension of the channel subspace according to the effective dimension of the channel subspace and the subspace index that are fed back by the user equipment;
sending, by the base station, fourth downlink signaling to the user equipment for instructing the user equipment to feed back a subspace index in the effective dimension of the channel subspace determined by the base station; and
receiving, by the base station, the subspace index fed back by the user equipment and that is in the effective dimension of the channel subspace determined by the base station.

6. A method for feeding back channel state information, the method comprising:
receiving, by user equipment, one or multiple pieces of downlink signaling from a base station, wherein the one or multiple pieces of downlink signaling instruct the user equipment to feed back channel dimension information, wherein the channel dimension information comprises an effective dimension of a channel subspace of a statistical channel between the base station and the user equipment and a subspace index in the effective dimension of the channel subspace, wherein the subspace index is in a one-to-one correspondence with a quantized preceding matrix of eigenvectors of the channel subspace, and wherein the effective dimension of the channel subspace is less than a quantity of reference signal ports used to measure channel state information; and
feeding back, by the user equipment, the channel dimension information to the base station.

7. The method according to claim 6, wherein the quantized precoding matrix, corresponding to the subspace index, of the eigenvectors of the channel subspace comprises partial energy of the statistical channel.

8. The method according to claim 6, further comprising:
performing, by the user equipment, statistical measurement on the channel subspace to obtain the effective dimension of the channel subspace.

9. An apparatus for obtaining channel state information, the apparatus comprising:
a transmitter, configured to send one or multiple pieces of downlink signaling to user equipment for instructing the user equipment to feed back channel dimension information, wherein the channel dimension information comprises an effective dimension of a channel subspace of a statistical channel between the apparatus and the user equipment and a subspace index in the effective dimension of the channel subspace, wherein the subspace index is in a one-to-one correspondence with a quantized precoding matrix of eigenvectors of the channel subspace, and wherein the effective dimension of the channel subspace is less than a quantity of reference signal ports used to measure channel state information; and
a receiver, configured to receive the channel dimension information fed back by the user equipment.

10. The apparatus according to claim 9, wherein the quantized precoding matrix, corresponding to the subspace index, of the eigenvectors of the channel subspace comprises partial energy of the statistical channel.

11. The apparatus according to claim 9, wherein sending the one or multiple pieces of downlink signaling to the user equipment comprises: sending first downlink signaling to the user equipment for instructing the user equipment to feed back the effective dimension of the channel subspace;

wherein receiving the channel dimension information fed back by the user equipment comprises: receiving the effective dimension of the channel subspace fed back by the user equipment;

wherein the transmitter is further configured to: send second downlink signaling to the user equipment for instructing the user equipment to feed back the subspace index, wherein the second downlink signaling carries an effective dimension of the channel subspace determined by the apparatus according to the effective dimension of the channel subspace fed back by the user equipment; and wherein receiving the channel dimension information fed back by the user equipment further comprises: receiving a subspace index fed back by the user equipment and that is in the effective dimension of the channel subspace determined by the apparatus.

12. The apparatus according to claim 9, wherein the transmitter is further configured to: send third downlink signaling to the user equipment for instructing the user equipment to feed back the effective dimension of the channel subspace and a subspace index in the effective dimension of the channel subspace; and wherein the receiver is further configured to: receive the effective dimension of the channel subspace and the subspace index in the effective dimension of the channel subspace fed back by the user equipment.

13. The apparatus according to claim 12, wherein the apparatus further comprises:

a processor, configured to determine an effective dimension of the channel subspace according to the effective dimension of the channel subspace and the subspace index that are fed back by the user equipment;

wherein the transmitter is further configured to send fourth downlink signaling to the user equipment for instructing the user equipment to feed back a subspace index in the effective dimension of the channel subspace that is determined by the apparatus; and wherein the receiver is further configured to receive the subspace index fed back by the user equipment and that is in the effective dimension of the channel subspace determined by the base station.

14. An apparatus for feeding back channel state information, the apparatus comprising:

a receiver, configured to receive one or multiple pieces of downlink signaling from a base station, wherein the one or multiple pieces of downlink signaling instruct the apparatus to feed back channel dimension information, wherein the channel dimension information comprises an effective dimension of a channel subspace of a statistical channel between the base station and the user equipment and a subspace index in the effective dimension of the channel subspace, wherein the subspace index is in a one-to-one correspondence with a quantized precoding matrix of eigenvectors of the channel subspace, and wherein the effective dimension of the channel subspace is less than a quantity of reference signal ports used to measure channel state information; and a transmitter, configured to feed back the channel dimension information to the base station.

15. The apparatus according to claim 14, wherein the quantized precoding matrix, corresponding to the subspace index, of the eigenvectors of the channel subspace comprises partial energy of the statistical channel.

16. The apparatus according to claim 14, further comprising:

a processor, configured to perform statistical measurement on the channel subspace to obtain the effective dimension of the channel subspace.

* * * * *

UNITED STATES PATENT AND TRADEMARK OFFICE
CERTIFICATE OF CORRECTION

PATENT NO. : 10,447,369 B2
APPLICATION NO. : 15/858969
DATED : October 15, 2019
INVENTOR(S) : Ye Wu et al.

Page 1 of 1

It is certified that error appears in the above-identified patent and that said Letters Patent is hereby corrected as shown below:

Claim 6, Column 22 Line 31: "with a quantized preceding matrix" should read -- with a quantized precoding matrix --.

Signed and Sealed this
Ninth Day of June, 2020

Andrei Iancu
*Director of the United States Patent and Trademark Office*